(No Model.)
F. M. THEISEN.
STEERING DEVICE FOR TRACTION ENGINES.
No. 539,926. Patented May 28, 1895.
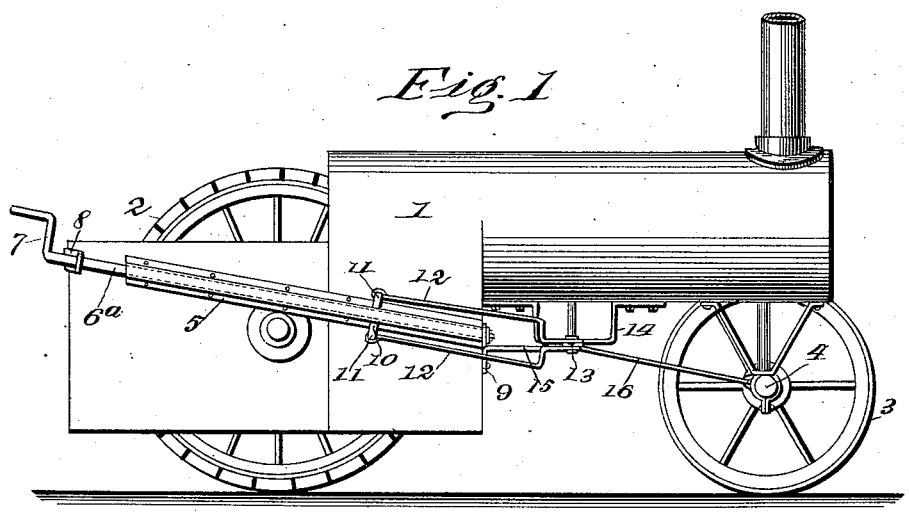
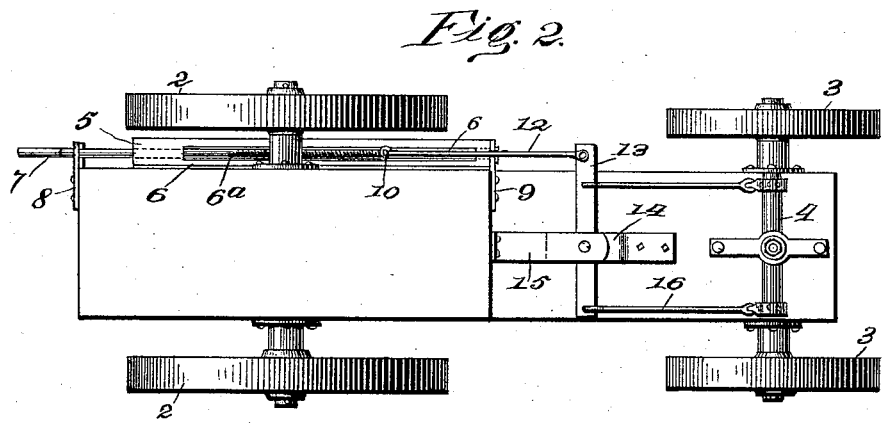

United States Patent Office.

FERDINAND M. THEISEN, OF INDEPENDENCE, WISCONSIN.

STEERING DEVICE FOR TRACTION-ENGINES.

SPECIFICATION forming part of Letters Patent No. 539,926, dated May 28, 1895.

Application filed February 21, 1895. Serial No. 539,280. (No model.)

*To all whom it may concern:*

Be it known that I, FERDINAND M. THEISEN, a citizen of the United States, and a resident of Independence, in the county of Trempealeau and State of Wisconsin, have invented certain new and useful Improvements in Steering Devices for Traction-Engines; and I do hereby declare the following to be a full, clear, and exact description of the invention, such as will enable others skilled in the art to which it appertains to make and use the same.

My invention relates to steering apparatus for traction engines. The same consists of a threaded rod having a crank extension at its rear end, the same mounted in suitable bearings on the side of the engine, a threaded collar surrounding said rod, having flanges projecting from each side thereof, each of which is connected by a rod to one end of a bar pivoted centrally to a bracket depending from the under side of the tubular boiler, the said bar in turn having rods connecting its outer ends with the axle of the front wheels which has a pivotal connection with the engine.

The invention also consists in other details of construction which will be more fully hereinafter described.

In the drawings forming a part of this specification, Figure 1 represents a side elevation of the traction-engine with one of the rear wheels removed and showing my steering device connected thereto. Fig. 2 is a bottom plan view of the same. Fig. 3 is a detail of the threaded rod.

Like reference-numerals indicate like parts in the views.

By reference to the drawings it will be seen that 1 represents a traction engine of ordinary construction, 2 the rear wheels thereof, and 3 the front wheels mounted on a suitable axle 4 which is pivotally connected at its center to the engine and is adapted to be moved on said pivotal connection.

Secured to one side of the engine at the rear end thereof is a suitable casing 5 provided with elongated slots 6 in each side thereof, and in this casing moves a threaded rod 6ª provided with a crank arm 7 at its rear end. The said rod 6 moves in suitable bearings at each end thereof formed by brackets 8 and 9, as clearly shown.

Surrounding the rod 6ª and adapted to move thereon is a threaded collar 10 having flanges 11, 11 on each side thereof, to which are connected rods 12, 12, in turn pivoted to a cross bar 13. The said bar 13 is pivoted at its center to an arched bracket 14, depending from the under side of the engine, and is further braced by means of a clip 15 extending forwardly from the rear part of the engine.

Pivotally connected to the outer ends of the bar 13 are rods or pitmen 16 attached at their forward ends to the axle of the front wheels, the connection being made on each side of its central or pivotal point.

By this construction it will be seen that the movement of the bar 13 on its pivot in one way or the other will turn the axle 4 and consequently the front wheels 3 in a corresponding direction.

The bar 13 is moved by turning the shaft 6 by means of the crank arm 7 thereon. The rotation of this shaft in one direction or the other will cause the threaded collar 10 to ride back and forth on the shaft 6, carrying with it the rods 12 connected to the outer end of the bar 13. The crank arm 7 is located at a point adjacent to the rear platform of the engine and within easy reach of the operator.

Having now described my invention, what I claim as new, and desire to secure by Letters Patent, is—

The combination with a traction engine having the axle of the front wheels thereof pivotally connected at its center to said engine, of a steering device therefor, consisting of a casing secured to the rear end of the engine at one side thereof, provided with elongated slots on each side, a rod having a crank arm at its rear end moving in said casing and mounted in bearings secured to said engine, a threaded collar moving on said rod having flanges on each side thereof, projecting through the slots in said casing, a cross bar pivoted to a bracket on the under side of the engine, and rods connecting the outer ends of said bar with the flanges on said collar, and pitmen connected to the outer ends of said bar and to the axle of the front wheels, substantially as and for the purpose described.

In testimony whereof I have signed this specification in the presence of two subscribing witnesses.

FERDINAND M. THEISEN.

Witnesses:
WILLIAM STEINER,
B. E. ARMSTRONG.